US011981156B2

(12) United States Patent
Matsui

(10) Patent No.: US 11,981,156 B2
(45) Date of Patent: May 14, 2024

(54) THERMAL TRANSFER SHEET

(71) Applicant: Dai Nippon Printing Co., Ltd., Tokyo (JP)

(72) Inventor: Hiroto Matsui, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 617 days.

(21) Appl. No.: 16/972,745

(22) PCT Filed: Jun. 27, 2019

(86) PCT No.: PCT/JP2019/025679

§ 371 (c)(1),
(2) Date: Dec. 7, 2020

(87) PCT Pub. No.: WO2020/004576

PCT Pub. Date: Jan. 2, 2020

(65) Prior Publication Data

US 2021/0260906 A1 Aug. 26, 2021

(30) Foreign Application Priority Data

Jun. 29, 2018 (JP) ................................ 2018-125587
Sep. 28, 2018 (JP) ................................ 2018-185363

(51) Int. Cl.
*B41M 5/44* (2006.01)
*B41M 5/42* (2006.01)

(52) U.S. Cl.
CPC .............. *B41M 5/443* (2013.01); *B41M 5/42* (2013.01); *B41M 2205/02* (2013.01); *B41M 2205/30* (2013.01); *B41M 2205/36* (2013.01)

(58) Field of Classification Search
CPC .... B41M 5/42; B41M 5/443; B41M 2205/02; B41M 2205/30; B41M 2205/36
See application file for complete search history.

(56) References Cited

U.S. PATENT DOCUMENTS 4,735,860 A 4/1988 Mizobuchi et al.
5,143,782 A 9/1992 Morishima et al.
(Continued)

FOREIGN PATENT DOCUMENTS

EP 2 762 323 A1 8/2014
JP H01-218887 A1 9/1989
(Continued)

OTHER PUBLICATIONS

Extended European Search Report (Application No. 19826490.5) dated Jul. 19, 2021.
(Continued)

*Primary Examiner* — Gerard Higgins
(74) *Attorney, Agent, or Firm* — BURR PATENT LAW, PLLC

(57) ABSTRACT

To provide a thermal transfer sheet capable of preventing print omission from occurring on a transfer layer to be transferred and producing of a print having a good gloss. A back face layer 20 is provided on one surface of the substrate 1 and a transfer layer 10 is provided on the other surface of the substrate, the transfer layer 10 has a single-layer or layered structure including a protective layer 5, the back face layer contains spherical particles 25, and when the surface of the back face layer is observed using a scanning electron microscope (SEM) at a magnification of 5000 times, the proportion of the total of the projected areas of the spherical particles is 1.8% or more and 20% or less based on the area of the entire observed surface.

4 Claims, 6 Drawing Sheets

(56) References Cited

U.S. PATENT DOCUMENTS

| | | | |
|---|---|---|---|
| 5,569,540 | A | 10/1996 | Hirose et al. |
| 6,737,152 | B2 | 5/2004 | Suzuki et al. |
| 2009/0165938 | A1 | 7/2009 | Muro et al. |
| 2010/0196631 | A1 | 8/2010 | Sawada |
| 2012/0189787 | A1 | 7/2012 | Sawada |
| 2013/0330488 | A1 | 12/2013 | Imakura et al. |
| 2014/0212604 | A1 | 7/2014 | Suzuki et al. |

FOREIGN PATENT DOCUMENTS

| | | | |
|---|---|---|---|
| JP | H03-065396 | A1 | 3/1991 |
| JP | H04-329194 | A1 | 11/1992 |
| JP | H06-055861 | A1 | 3/1994 |
| JP | H06-099670 | A1 | 4/1994 |
| JP | H07-096682 | A1 | 4/1995 |
| JP | H08-150787 | A1 | 6/1996 |
| JP | H09-001942 | A1 | 1/1997 |
| JP | H09-123624 | A1 | 5/1997 |
| JP | H09-123625 | A1 | 5/1997 |
| JP | H11-335425 | A1 | 12/1999 |
| JP | 2000-079768 | A1 | 3/2000 |
| JP | 2000-103178 | A1 | 4/2000 |
| JP | 2000-272254 | A1 | 10/2000 |
| JP | 2000-326641 | A1 | 11/2000 |
| JP | 2001-328359 | A1 | 11/2001 |
| JP | 2002-240404 | A1 | 8/2002 |
| JP | 2005-262690 | A1 | 9/2005 |
| JP | 2007-098696 | A1 | 4/2007 |
| JP | 2007-307764 | A1 | 11/2007 |
| JP | 2009-073102 | A1 | 4/2009 |
| JP | 2009-173024 | A | 8/2009 |
| JP | 2009-274428 | A1 | 11/2009 |
| JP | 2010-052364 | A1 | 3/2010 |
| JP | 2011-201092 | A1 | 10/2011 |
| JP | 2012-153020 | A1 | 8/2012 |
| JP | 2012-187924 | A1 | 10/2012 |
| JP | 2013-010312 | A2 | 1/2013 |
| JP | 2013-082210 | A1 | 5/2013 |
| JP | 2014-188894 | A1 | 10/2014 |
| JP | 2016-165844 | A1 | 9/2016 |
| JP | 2017-052141 | A1 | 3/2017 |

OTHER PUBLICATIONS

International Search Report and Written Opinion (Application No. PCT/JP2019/025679) dated Sep. 10, 2019.
U.S. Appl. No. 17/275,711, filed Mar. 12, 2021.
International Search Report and Written Opinion (Application No. PCT/JP2020/013380) dated Jun. 23, 2020 (with English translation).
International Search Report and Written Opinion (Application No. PCT/JP2019/037832) dated Dec. 10, 2019.
U.S. Appl. No. 17/593,872, filed Sep. 27, 2021.

THERMAL TRANSFER SHEET

TECHNICAL FIELD

The present invention relates to a thermal transfer sheet.

BACKGROUND ART

Formation of a thermal transferred image on a transfer receiving article using a sublimation-type thermal transfer method has been widely performed because of excellent transparency, high reproducibility and gradation of neutral tints, and easy formability of a high quality image equivalent to conventional full color photographic images. As a print in which a thermal transferred image is formed on a transfer receiving article, there are known digital photographs, and ID cards such as identity cards, driver's licenses, and membership cards, which are used in many fields. Formation of a thermal transferred image according to a sublimation-type thermal transfer method is performed by combining a thermal transfer sheet which is provided with a colorant layer formed on one surface of a substrate with a transfer receiving article, for example, a thermal transfer image-receiving sheet which is provided with a receiving layer formed on one surface of another substrate and applying energy to the back side of the thermal transfer sheet with a heating device such as a thermal head to thereby cause a colorant contained in the colorant layer to migrate onto the transfer receiving article.

By the way, in a thermal transferred image to be formed by the above sublimation-type thermal transfer method, the colorant is not a pigment but a dye having a relatively low molecular weight. Thus, the durability of the thermal transferred image itself is low. Then, usually, with respect to a thermal transferred image formed by the sublimation-type thermal transfer method, a thermal transfer sheet including a protective layer is used to transfer the protective sheet onto the thermal transferred image (see Patent Literatures 1 and 2).

By the way, when a thermal transfer printer including a heating device such as a thermal head and a thermal transfer sheet in which a protective layer as described above is provided are used to transfer the protective layer onto a transfer receiving article with the substrate kept in contact with the thermal head, frictional force occurring between the substrate and the thermal head results in wrinkles on the protective layer. The wrinkles may cause a problem of so-called print omission, in which a portion of the transfer layer originally to be transferred onto the side of the transfer receiving article is not transferred onto the side of the transfer receiving article. Under such a situation, in the field of thermal transfer sheets, a back face layer intended for reducing the frictional force is provided on a surface of the substrate located on the side of the thermal head. Various investigations on an improvement of the lubricity of a back face layer have been made. For example, Patent Literature 3 suggests a thermal transfer sheet including a protective layer and a back face layer containing an organic filler.

However, when the back face layer is caused to contain particles such as a filler in order to reduce the frictional force, irregularities resulting from the particles contained in the back face layer are likely to develop on the surface of the protective layer after transfer because of pressing on the back face layer by the thermal head or the like. Such irregularities developing on the surface of the protective layer after transfer may lead to a decrease in the gloss of the protective layer. In other words, it can be said that preventing print omission from occurring and making the gross of the protective layer good are in the trade-off relationship.

CITATION LIST

Patent Literature

Patent Literature 1: Japanese Patent Laid-Open No. 2005-262690

Patent Literature 2: Japanese Patent Laid-Open No. 2002-240404

Patent Literature 3: Japanese Patent Laid-Open No. 2007-307764

SUMMARY OF INVENTION

Technical Problem

The present invention has been made in view of the above-mentioned circumstances, and the present invention aims principally to provide a thermal transfer sheet capable of preventing print omission from occurring on a transfer layer to be transferred and producing of a print having a good gloss.

Solution to Problem

In a thermal transfer sheet according to an embodiment of the present disclosure for solving the above problems, a back face layer is provided on one surface of a substrate and a transfer layer is provided on the other surface of the substrate, the transfer layer has a single-layer structure or a layered structure including a protective layer, the back face layer contains spherical particles, and when the surface of the back face layer is observed using a scanning electron microscope (SEM) at a magnification of 5000 times, the proportion of the total of the projected areas of the spherical particles is 1.8% or more and 20% or less based on the area of the entire observed surface.

The spherical particles may be a spherical silicone resin.

The proportion of the number of spherical particles having a maximum particle size of 0.1 μm or more and 3 μm or less, which can be determined from the projection image of the observed surface, may be 80% or more based on the total number of the spherical particles observed in the observed surface.

The content of the spherical particles having a maximum diameter of 0.1 μm or more and 3 μm or less may be 90% by mass or more based on the total mass of the spherical particles contained in the back face layer.

Advantageous Effects of Invention

According to the thermal transfer sheet of the present disclosure, it is possible to prevent print omission from occurring on a transfer layer to be transferred and produce a print having a good gloss.

DESCRIPTION OF EMBODIMENTS

«Thermal Transfer Sheet»

Hereinbelow, a thermal transfer sheet 100 according to an embodiment of the present disclosure (hereinbelow, referred to as the thermal transfer sheet of the present disclosure) will be described specifically using the drawings.

Figure 1:
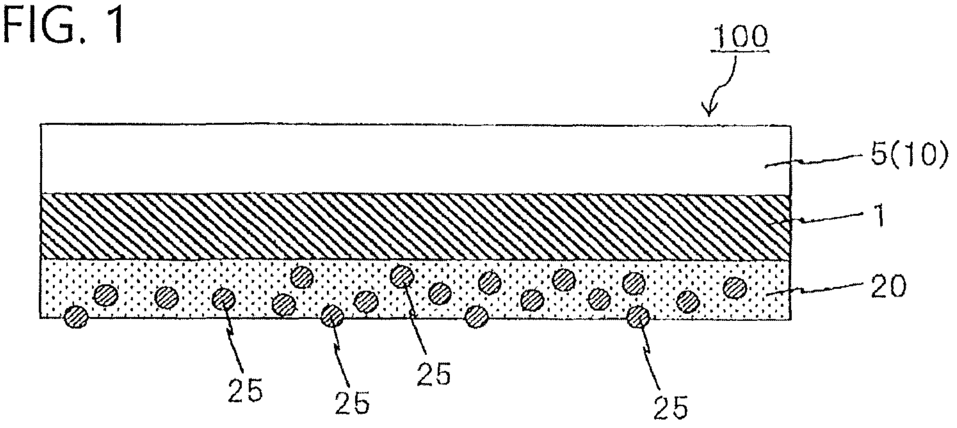
FIG. 1 is a schematic cross-sectional view showing an exemplary thermal transfer sheet of the present disclosure.
Figure 2:
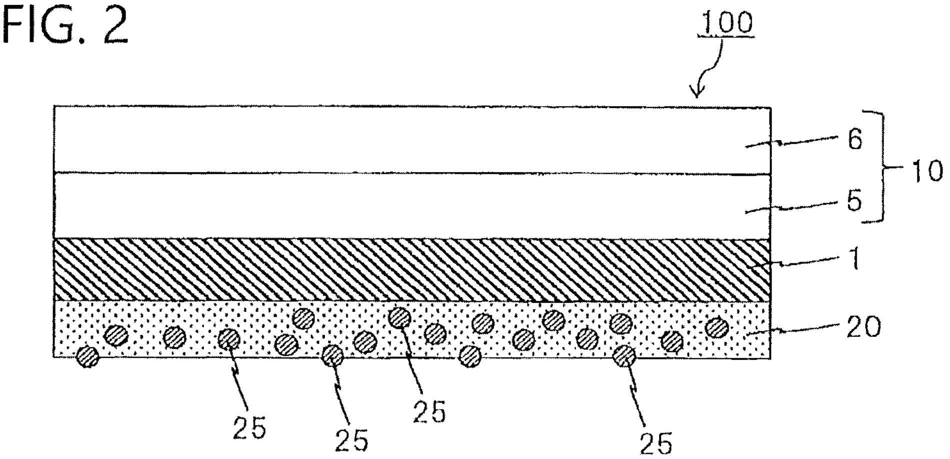
FIG. 2 is a schematic cross-sectional view showing an exemplary thermal transfer sheet of the present disclosure.
Figure 3:
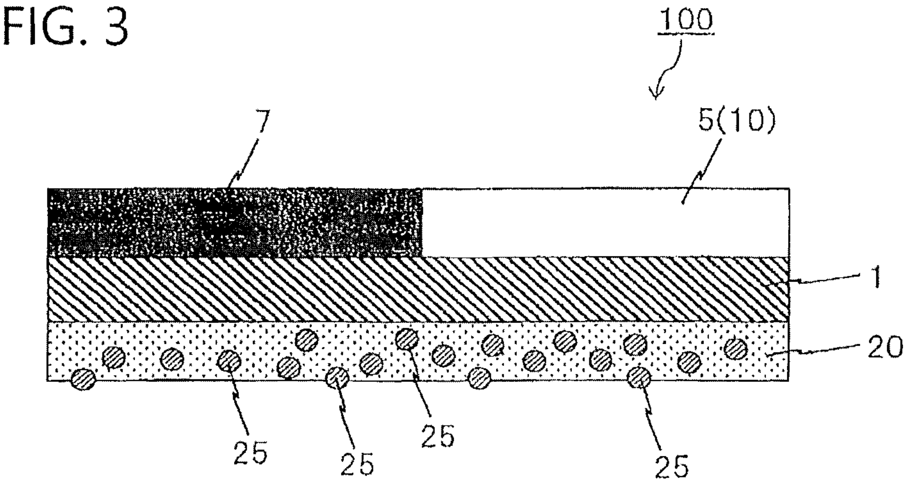
FIG. 3 is a schematic cross-sectional view showing an exemplary thermal transfer sheet of the present disclosure.

As shown in FIGS. 1 to 3, the thermal transfer sheet 100 of the present disclosure includes a substrate 1, a back face layer 20 provided on one surface of the substrate 1, and a transfer layer 10 provided on the other surface of the substrate 1. The transfer layer 10 is a layer that has a single-layer or layered structure including a protective layer 5 and is to be released at the surface of the transfer layer 10 on the side of the substrate 1. FIGS. 1 to 3 are schematic cross-sectional views each showing an example of the thermal transfer sheet 100 of the present disclosure.

Figure 4A:
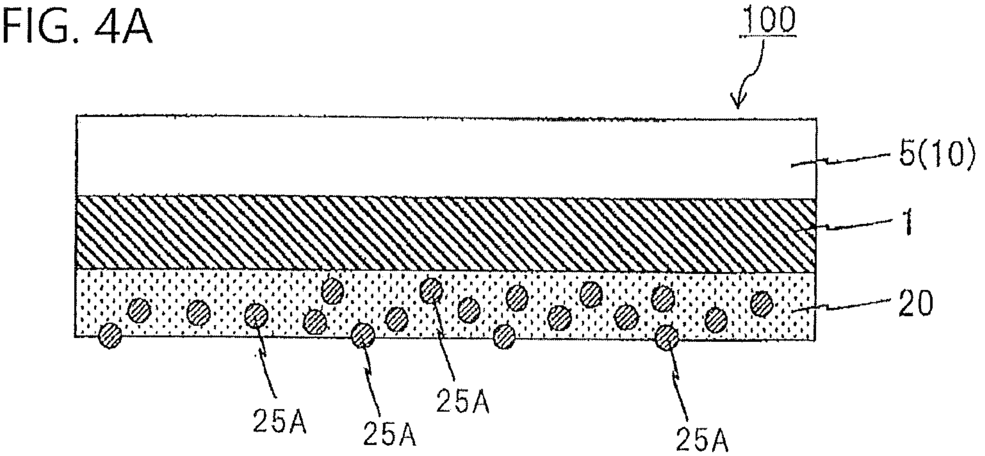
FIGS. 4A to 4C are schematic cross-sectional views each showing an exemplary thermal transfer sheet.
Figure 4B:
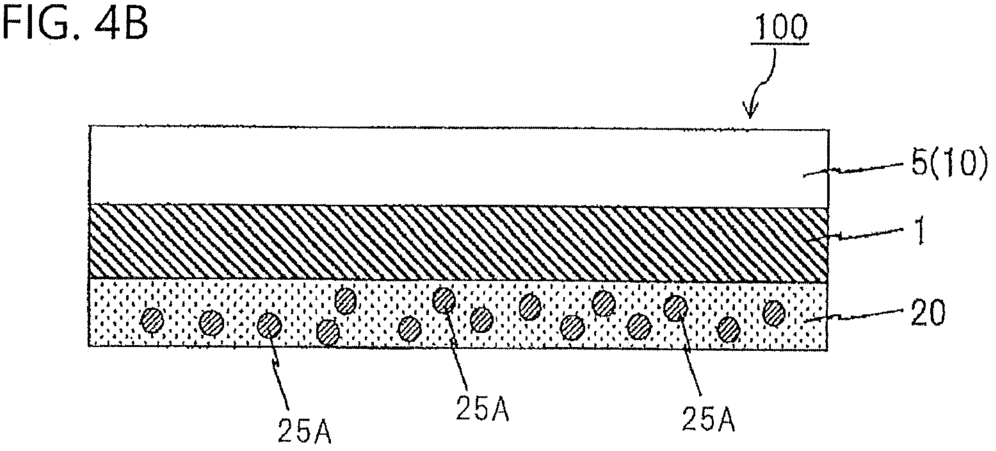
Figure 4C:
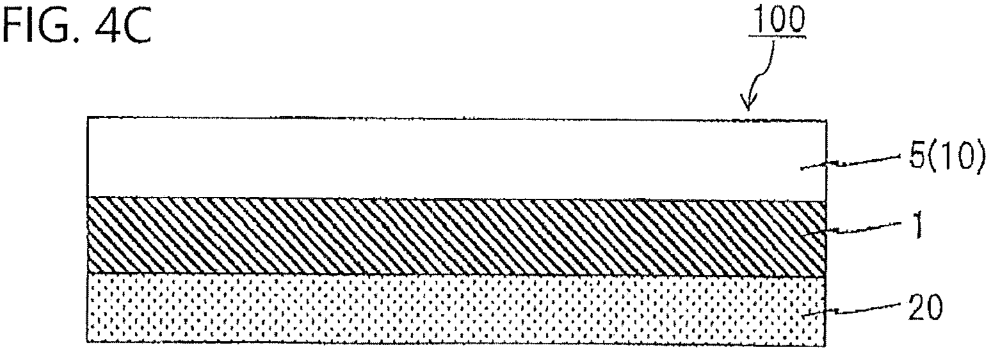
Figure 5A:
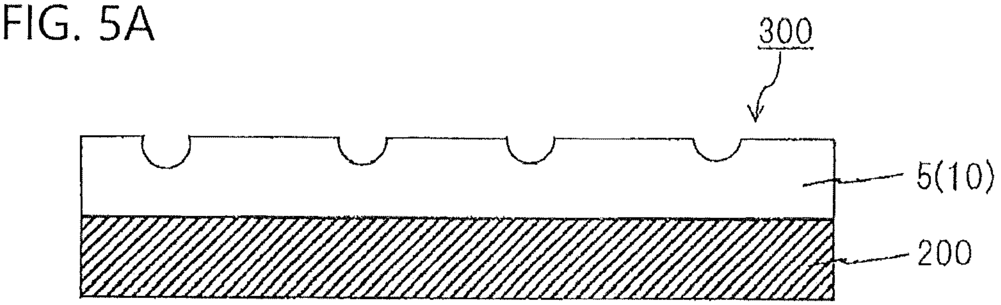
FIGS. 5A to 5C are schematic cross-sectional views respectively showing exemplary prints produced using the thermal transfer sheets shown in FIGS. 4A to 4C.
Figure 5B:
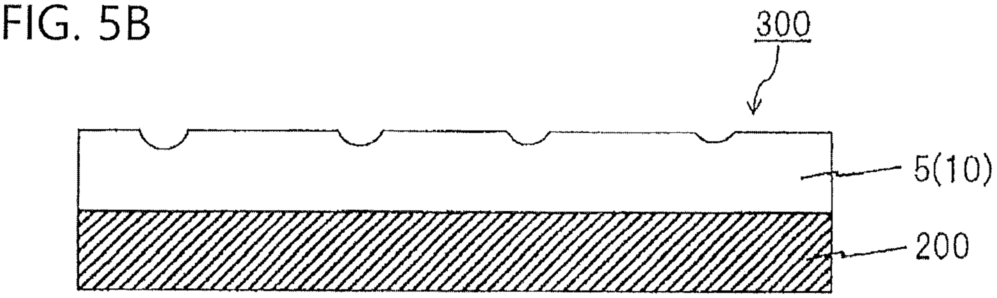
Figure 5C:
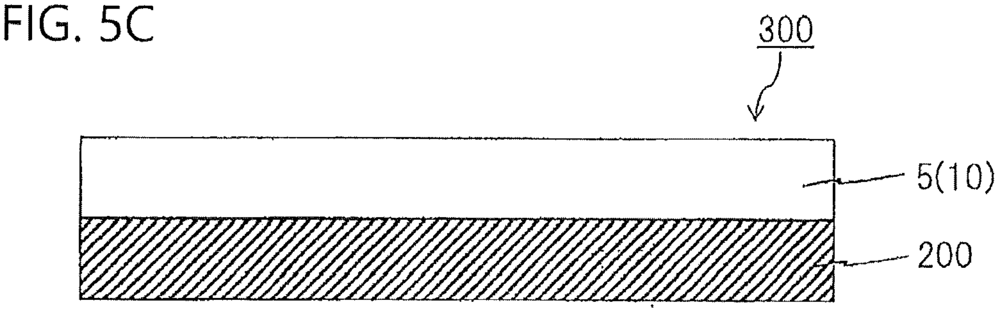

In describing the thermal transfer sheet 100 of the present disclosure, first, with reference to FIGS. 4A to 4C and FIGS. 5A to 5C, the surface state of the transfer layer 10 after transfer and the relationship between the transfer layer 10 and the back face layer 20, when the transfer layer 10 including the protective layer 5 is transferred onto a transfer receiving article 200, will be described. FIGS. 4A to 4C are schematic cross-sectional views of each thermal transfer sheet 100, in which the back face layer 20 is provided on one surface of the substrate 1 and the transfer layer 10 of a single-layer structure composed only of the protective layer 5 is provided on the other surface of the substrate 1. The thermal transfer sheet 100 of an aspect shown in FIG. 4A has a structure in which the back face layer 20 contains particles 25A and the particles 25A project from the surface of the back face layer 20. The thermal transfer sheet 100 of an aspect shown in FIG. 4B has a structure in which the back face layer 20 contains particles 25A and the particles 25A are present only inside the back face layer 20 without projecting from the surface of the back face layer 20. The thermal transfer sheet 100 of an aspect shown in FIG. 4C has a structure in which the back face layer 20 contains no particles 25A. FIG. 5A is a schematic cross-sectional view of a print 300 produced by transferring the transfer layer 10 (protective layer 5) of the thermal transfer sheet 100 in FIG. 4A onto a transfer receiving article 200. FIG. 5B is a schematic cross-sectional view of a print 300 produced by transferring the transfer layer 10 (protective layer 5) of the thermal transfer sheet 100 in FIG. 4B onto a transfer receiving article 200. FIG. 5C is a schematic cross-sectional view of a print 300 produced by transferring the transfer layer 10 (protective layer 5) of the thermal transfer sheet 100 in FIG. 4C onto a transfer receiving article 200. In FIGS. 5A and 5B, irregularities developed on the surface of the transfer layer 10 after transfer are shown exaggerated.

The transfer layer 10 is transferred onto the transfer receiving article 200 by bringing the back face layer 20 of the thermal transfer sheet into contact with a heating device (e.g., a thermal head) and applying energy to the side of the back face layer 20. In this time, a predetermined print pressure is applied to the back face layer 20 by the heating device. In other words, the back face layer 20 is pushed in by the heating device. Accordingly, as shown in FIGS. 4A and 5B, when the back face layer 20 contains the particles 25A, in transferring the transfer layer 10, the particles 25A projecting from the back face layer 20 and the particles 25A present inside the back face layer are pushed into the side of the transfer layer 10 by the print pressure applied to the back face layer 20, and as shown in FIGS. 5A and 5B, irregularities conforming to the shape of the particles 25A contained in the back face layer 20 are likely to develop on the surface of the transfer layer. 10 after transferred on the transfer receiving article 200. Particularly as shown in FIG. 4A, in the structure in which the particles 25A project from the surface of the back face layer 20, the frequency of occurrence of these irregularities tends to be higher and the magnitude of the irregularities tends to be greater, and the smoothness of the surface of the transfer layer 10 tends to be lower. In contrast, as shown in FIG. 4C, when the back face layer 20 contains no particles 25A, irregularities are unlikely to occur on the surface of the transfer layer 10 after transfer, and as shown in FIG. 5C, the smoothness of the transfer layer 10 after transfer becomes high. In FIG. 4 and FIG. 5, the transfer layer 10 has a single-layer structure composed only of the protective layer 5, but the same applies to a case where the transfer layer 10 has a layered structure.

The smoothness of the surface of the transfer layer 10 after transfer is closely related with the gloss of the transfer layer 10, in other words, the gloss of the protective layer 5. The lower the smoothness of the surface of the transfer layer 10 after transfer, the lower the gloss. In other words, as the magnitude of the irregularities developing on the surface of the transfer layer 10 after transfer becomes greater, and also, as the number of projections (the number of recesses) increases, the gloss of the transfer layer 10 after transfer becomes lower. Further, when the shape of the particles 25A contained in the back face layer 20 is non-spherical, the gloss of the transfer layer 10 after transfer becomes low. Thus, when production of a print having a high gross is intended, it is required that smoothness of the surface of the transfer layer 10 after transfer become high. That is, it is required that the content of the particles 25A to be contained in the back face layer 20 and the like be considered. As shown in FIG. 4C, when the back face layer 20 contains no particles 25A, a high gloss can be imparted to the transfer layer 10 after transfer. However, in this case, the frictional force of the back face layer becomes extremely high, wrinkles are likely to occur on the transfer layer in transferring the transfer layer, and print omission is more likely to occur, due to these wrinkles, on the transfer layer to be transferred.

(Back Face Layer)

Then, in the thermal transfer sheet 100 of the present disclosure, the back face layer 20 provided on one surface of the substrate 1 contains the spherical particles 25, and when the surface of the back face layer 20 is observed using a scanning electron microscope (SEM) at a magnification of 5000 times, the proportion of the total of the projected areas of the spherical particles 25 is specified to be 1.8% or more and 20% or less based on the area of the entire observed surface. The total of the projected areas of the spherical particles referred to herein means a summed area obtained by calculating the projected area of each spherical particle and summing up the areas.

According to the thermal transfer sheet 100 of the present disclosure, which includes such a back face layer, it is possible to lower the frictional force between the back face layer 20 and the heating device, in other words, to make the lubricity of the back face layer 20 good and to prevent print omission from occurring on the transfer layer. It is also possible to prevent debris of the back face from adhering to or depositing on the heating device. Further, it is possible to make the gloss of the transfer layer 10 after transfer good. These effects in the thermal transfer sheet 100 of the present disclosure are synergistic effects of allowing the back face layer 20 to contain spherical particles and setting the proportion of the total of the projected areas of the spherical particles 25 to 1.8% or more and 20% or less based on the area of the entire observed surface.

That is, according to the thermal transfer sheet 100 of the present disclosure, use of the thermal transfer sheet 100 can prevent print omission from occurring on the transfer layer to be transferred as well as produce a print having a good gloss.

The back face layer 20 of a preferred aspect has a proportion of the total of the projected areas of the spherical particles 25 of 2% or more and 20% or less, more preferably of 2.3% or more and 20% or less, further preferably of 2.3% or more and 15% or less, based on the area of the entire observed surface.

The proportion of the total of the projected areas of the spherical particles 25 based on the area of the entire observed surface during observation using a scanning electron microscope (SEM) at a magnification of 5000 times can be calculated using image analysis software (Image J, U.S. National Institute of Health). Specifically, the proportion can be obtained by calculating the projected area of each spherical particle using a scanning electron microscope (SU1510, Hitachi High-Technologies Corporation) as the scanning electron microscope (SEM), summing up the projected areas of the spherical particles to obtain the summed area, and dividing the summed area by the area of the entire observed surface.

The area observed with the scanning electron microscope (SEM) is the back face layer 20 overlapping the center portion of the transfer layer 10, and the size of the observed surface at the magnification of 5000 times was defined as a region having a length of 17 μm and a width of 25 μm. The acceleration voltage during observation was set to 5 kV. In advance of observation with the scanning electron microscope (SEM), the back face layer was subjected to sputtering (target: Pt (platinum)) to form a Pt (platinum) thin film having a thickness of 10 nm or less.

Figure 6:
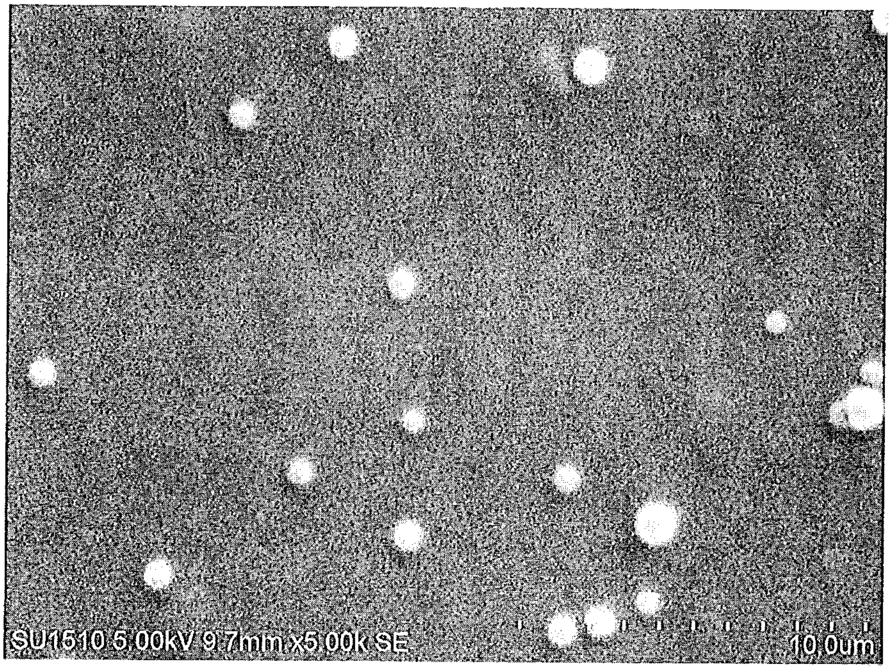
FIG. 6 is an observation view when a back face layer is observed using a scanning electron microscope (SEM).
Figure 7:
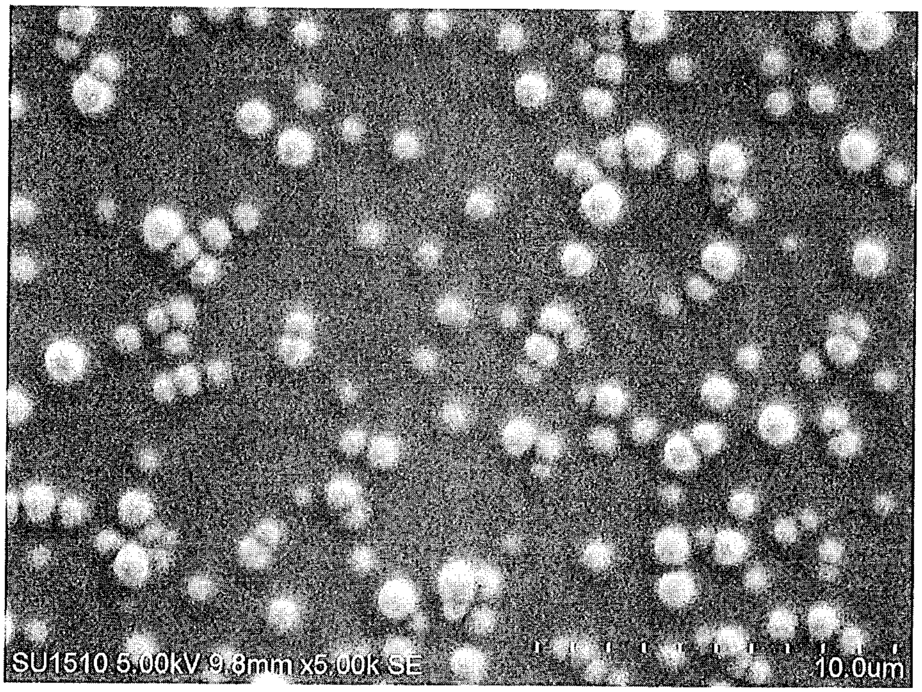
FIG. 7 is an observation view when a back face layer is observed using a scanning electron microscope (SEM).
Figure 8:
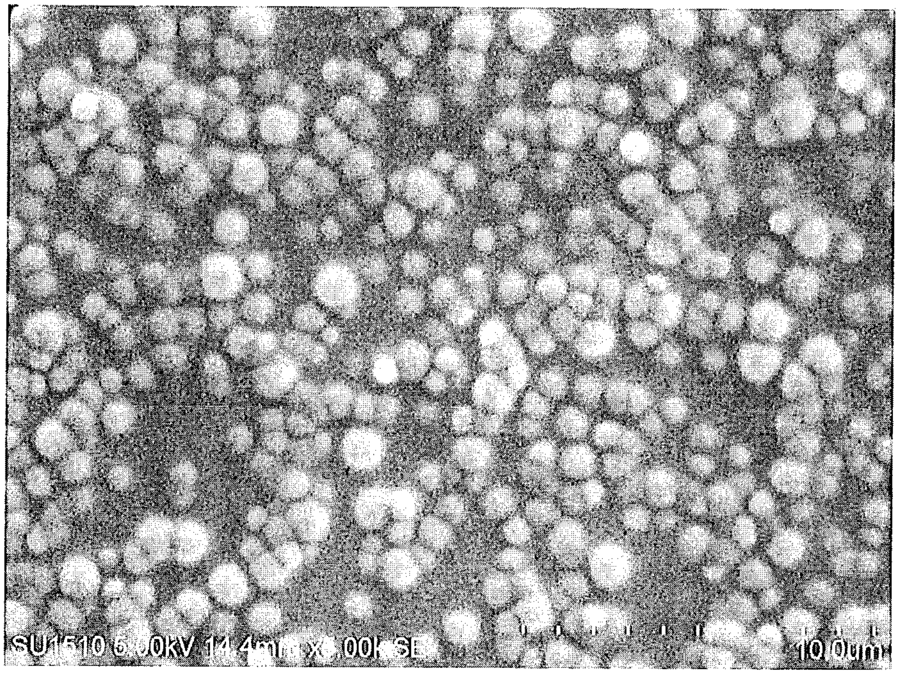
FIG. 8 is an observation view when a back face layer is observed using a scanning electron microscope (SEM).

FIGS. 6 to 8 are SEM images during observation at a magnification of 5000 times using a scanning electron microscope (SEM). FIG. 6 shows a back face layer having a proportion of the total of the projected areas of the spherical particles 25 of 1.6% based on the area of the entire observed surface. FIG. 7 shows a back face layer having a proportion of the total of the projected areas of the spherical particles 25 of 12.6% based on the area of the entire observed surface. FIG. 8 shows a back face layer having a proportion of the total of the projected areas of the spherical particles 25 of 21.8% based on the area of the entire observed surface.

The spherical particles referred to herein mean particles having a value, obtained by dividing the minimum diameter thereof by the maximum diameter thereof, of 0.7 or more, when the diameters of the particles in the SEM image during observation using a scanning electron microscope (SEM) at a magnification of 5000 times are determined, the diameter of the smallest value is taken as the minimum diameter, and the diameter of the largest value is taken as the maximum diameter. The diameter of the particles can be measured using the SEM image and image analysis software.

The type of spherical particles is not limited, and the particles may be spherical inorganic particles or may be spherical organic particles. The particles also may be spherical hybrid particles. Examples of the spherical particles include spherical talc, spherical carbon black, spherical aluminum, spherical molybdenum disulfide, spherical calcium carbonate, spherical polyethylene wax, spherical silicone resin, spherical melamine-formaldehyde condensate, spherical benzoguanamine-melamine-formaldehyde condensate, spherical benzoguanamine-formaldehyde condensate, spherical acrylic resin, spherical styrene resin, spherical nylon resin, spherical PTFE, and spherical butadiene. The back face layer 20 may contain one type of spherical particles or may two or more types of spherical particles.

Among these, the spherical silicone resin is suitable spherical particles in respect of imparting a good gloss to the transfer layer 10 after transfer as well as better preventing print omission from occurring on the transfer layer to be transferred.

When the surface of the back face layer 20 is observed using a scanning electron microscope (SEM) at a magnification of 5000 times, the proportion of the number of the spherical particles having a maximum diameter of 0.1 μm or more and 3 μm or less, which can be determined with the projection image and image analysis software, is preferably 80% or more, more preferably 90% or more, even more preferably 92.5% or more, based on the total number of the spherical particles projected within the observed surface. According to the back face layer 20 of this aspect, it is possible to better prevent print omission from occurring on the transfer layer to be transferred and make the gloss of transfer layer after transfer good.

When the surface of the back face layer 20 is observed using a scanning electron microscope (SEM) at a magnification of 5000 times, the proportion of the number of the spherical particles having a particle area of 0.003 $\mu m^2$ or more and 7.5 $\mu m^2$ or less, which can be determined with the projection image and image analysis software, is preferably 80% or more, more preferably 90% or more, even more preferably 92.5% or more, based on the total number of the spherical particles projected within the observed surface.

The number of the spherical particles having a maximum diameter of 0.1 μm or more and 3 μm or less is preferably 90% or more, more preferably 95% or more, even more preferably 98% or more, based on the total number of the spherical particles contained in the back face layer 20. According to the back face layer 20 of this aspect, it is possible to better prevent print omission from occurring on the transfer layer to be transferred and make the gloss of transfer layer after transfer good.

The content of the spherical particles having a maximum diameter of 0.1 μm or more and 3 μm or less is preferably 90% by mass or more based on the total mass of the spherical particles 25 contained in the back face layer 20. According to the back face layer 20 of this aspect, it is possible to make the gloss of the transfer layer after transfer better.

The summed mass of the spherical particles is preferably 0.5% by mass or more and 20% by mass or less, more preferably 1.5% by mass or more and less than 15% by mass, based on the total mass of the back face layer 20.

Particularly, the spherical particles are preferably spherical particles having a maximum diameter of 0.1 μm or more and 3 μm or less.

The back face layer 20 may contain non-spherical particles along with the above spherical particles. In this case, when the surface of the back face layer 20 is observed using a scanning electron microscope (SEM) at a magnification of 5000 times, the proportion of the total of the projected areas of the non-spherical particles is preferably 2% or less, more preferably 0.8% or less, even more preferably 0.5% or less, based on the area of the entire observed surface. According to the back face layer 20 of this aspect, it is possible to prevent print omission from occurring on the transfer layer to be transferred and make the gloss of transfer layer after transfer good. Further, also in image formation using a colorant layer mentioned below, it is possible to more effectively prevent print omission from occurring on the thermal transferred image.

The summed mass of the non-spherical particles is preferably 2% by mass or less, more preferably less than 1% by mass, even more preferably 0.8% by mass or less, based on the total mass of the back face layer 20.

The back face layer 20 contains a resin component along with the above spherical particles. Examples of the resin component can include, but are not limited to, polyesters, polyacrylic esters, polyvinyl acetate, acrylic polyols, acryl-styrene copolymers, urethane resins, polyolefins such as polyethylene and polypropylene, polystyrene, polyvinyl chloride, polyethers, polyamides, polyimides, polyamideimides, polycarbonate, polyacrylamide, polyvinyl chloride, polyvinyl acetals such as polyvinyl acetoacetal and polyvinyl butyral, and silicone-modified forms of these. It is also possible to use a cured resin obtained by curing such a resin component with a curing agent. In other words, a reaction product of a curable resin and a curing agent may be used. Examples of the curing agent include isocyanate-type curing agents.

As the resin component, a siloxane crosslinked resin may be used. According to the back face layer 20 containing a siloxane crosslinked resin, it is possible to make the lubricity of the back face layer 20 better and sufficiently enhance the strength of the back face layer. According to the back face layer 20 like this, due to a synergistic effect with an effect obtained by allowing the spherical particles described above to contain and, when the surface of the back face layer 20 is observed using a scanning electron microscope (SEM) at a magnification of 5000 times, setting the proportion of the total of the projected areas of the spherical particles 25 to 1.8% or more and 20% or less, based on the area of the entire observed surface, it is possible to better prevent print omission from occurring and make the gloss of the transfer layer to be transferred better. Specifically, enhancing the strength of the back face layer 20 enables, when the back face layer 20 is pushed in by a heating device, conformability of the back face layer 20 to the pushing-in to be lower, and as a result, it is possible to enhance the smoothness of the surface layer of the transfer layer to be transferred.

The siloxane crosslinked resin is a crosslinked resin obtained by crosslinking (curing) an alkoxysilyl group-containing resin, and specifically a resin including a "Si—O—Si" crosslinked structure formed by hydrolysis of an alkoxysilyl group of an alkoxysilyl group-containing resin and a silanol reaction.

Examples of the alkoxysilyl group-containing resin (including alkoxysilyl group-modified resins, which include an alkoxysilyl group introduced) can include alkoxysilyl group-containing acrylic resins, alkoxysilyl group-containing polyesters, group-containing epoxy resins, alkoxysilyl group-containing alkyd resins, alkoxysilyl group-containing fluorine resins, alkoxysilyl group-containing polyurethane, alkoxysilyl group-containing phenol resins, and alkoxysilyl group-containing melamine resins. Examples of the alkoxysilyl group can include a trialkoxysilyl group, a dimethoxysilyl group, and a monoalkoxysilyl group. Accordingly, examples of a siloxane crosslinked resin to be obtained from such an alkoxysilyl group-containing resin can include siloxane crosslinked acrylic resins, siloxane crosslinked polyesters, siloxane crosslinked epoxy resins, siloxane crosslinked alkyd resins, siloxane crosslinked fluorine resins, siloxane crosslinked polyurethane, siloxane crosslinked phenol resins, and siloxane crosslinked melamine resins. Among these, a siloxane crosslinked acrylic resin is preferred.

When a siloxane crosslinked resin is obtained from an alkoxysilyl group-containing resin, a crosslinking agent (curing agent) may be used. The crosslinking agent may be appropriately selected in accordance with the alkoxysilyl group-containing resin. For example, when an alkoxysilyl group-containing acrylic resin is used, a zirconia-type curing agent, an aluminum-type curing agent, a titanium-type curing agent, a tin-type curing agent, or the like may be used. There is no limitation on the content of the curing agent, and an example thereof is 0.01% by mass or more and 20% by mass or less based on the total mass of the resin composition for forming the back face layer.

The back face layer 20 may contain one resin component or may contain two or more resin components.

The back face layer 20 also may contain various additives. Examples of the additives can include a release agent such as higher fatty acid amides, phosphoric ester compounds, metal soaps, silicone oils, and surfactants.

There is no limitation on the thickness of the back face layer 20, and the thickness can be appropriately set within a range where the proportion of the total of the projected areas of the spherical particles 25 reaches the above proportion, based on the area of the entire observed surface when the surface of the back face layer 20 is observed using a scanning electron microscope (SEM) at a magnification of 5000 times. The thickness of the back face layer 20, as an example, is 0.1 μm or more and 1 μm or less.

There is no particular limitation on a method for forming the back face layer 20. The back face layer may be formed by dispersing or dissolving a resin component, spherical particles, and various additive to be used as required in an appropriate solvent to prepare a coating liquid for back face layer, applying the coating liquid on one surface of the substrate 1 or an optional layer provided on the one surface of the substrate 1 (e.g., a back face primer layer mentioned below), and drying the coated film. Examples of the coating method can include a gravure printing method, a screen printing method, and a reverse roll coating method using a gravure printing plate. Coating methods other than these methods also may be used. The same applies to coating methods for various coating liquids mentioned below.

(Back Face Primer Layer)

A back face primer layer (not shown) may be provided between the substrate 1 and the back face layer 20. The back face primer layer is a layer to be provided in order to improve the adhesion between the substrate 1 and the back face layer 20, being an optional constituent in the thermal transfer sheet 100 of the present disclosure. Examples of the resin component constituting the back face primer layer can include polyesters, polyurethane, acrylic resins, polycarbonate, polyamides, polyimides, polyamideimides, vinyl chloride-vinyl acetate copolymers, polyvinyl butyral, polyvinyl alcohol, and polyvinyl pyrrolidone.

(Substrate)

The substrate 1 is an essential component in the thermal transfer sheet 100 of the present disclosure and supports the above back face layer 20 provided on one surface of the substrate 1, the transfer layer 10 provided on the other surface of the substrate 1, and the like. There is no limitation on the material of the substrate 1, and the material desirably has heat resistance and mechanical characteristics. Examples of the substrate 1 like this can include various plastic films or sheets of polyesters such as polyethylene terephthalate, polycarbonate, polyimides, polyether imides, cellulose derivatives, polyethylene, polypropylene, styrene resins, acrylic resins, polyvinyl chloride, polyvinylidene chloride, nylon, or polyether ether ketone. The thickness of the substrate 1 may be appropriately selected depending on the kind of the material of the substrate, so that the strength, heat resistance and the like of the substrate sheet lie in appropriate ranges, and is generally 2.5 μm or more and 100 μm or less.

(Transfer Layer)

As shown in FIG. 1 to FIG. 3, the transfer layer 10 is provided on the other surface of the substrate 1 (the upper surface of the substrate in the aspect shown). The transfer layer 10 has a single-layer structure composed only of a protective layer 5 (see FIG. 1 and FIG. 3) or has a layered structure including a protective layer (see FIG. 2). The transfer layer 10 of the aspect shown in FIG. 2 has a layered structure of a protective layer 5 and an adhesive layer 6 which are layered in this order from the side of the substrate 1. The transfer layer 10 is not limited to the aspect shown and is only required to satisfy a condition of inclusion of the protective layer 5. For example, in the aspect shown in FIG. 2, the transfer layer 10 may have a configuration in which a primer layer intended to improve the adhesion between the protective layer 5 and the adhesive layer 6 is provided between the protective layer 5 and the adhesive layer, or may have a configuration in which various functional layers are provided on the protective layer 5. Among layers constituting the transfer layer 10, the layer located nearest from the substrate 1 may be a peelable layer. Alternatively, the constituents shown in each figure may be appropriately combined.

(Protective Layer)

There is no limitation on the protective layer 5, and protective layers conventionally known in the field of thermal transfer sheets can be appropriately selected and used. Examples of the resin component constituting the protective layer 5 can include polyesters, polystyrene, acrylic resins, polyurethane, acryl urethane, resins obtained by silicone-modifying each of these resins, cured products of an active ray-curable resin, and any blends of these resins. The active ray-curable resin referred to herein means a precursor or a composition before irradiated with an active ray. The active ray-curable resin referred to herein also means a radioactive ray which is allowed to chemically act on an active ray-curable resin to promote polymerization, specifically meaning a visible light ray, an ultraviolet ray, an X ray, an electron beam, an α ray, a β ray, a γ ray, or the like. The protective layer 5 may contain one resin component or may contain two or more resin components. When the transfer layer 10 is caused to have a single-layer structure composed only of a protective layer 5 or when, among layers constituting the transfer layer 10, the protective layer 5 is caused to be located farthest from the substrate 1, an adhesive property may be imparted to the protective layer 5 by causing the protective layer 5 to contain a resin component having an adhesive property mentioned below.

The protective layer 5 may contain other components along with the above resin component. Examples of the other components can include a filler. It is possible to improve the foil cutting property of the transfer layer 10 by causing the protective layer 5 to contain a filler.

Examples of the filler can include organic fillers, inorganic fillers, and organic-inorganic hybrid-type fillers. The filler may be a powder or a sol-type one, but a powder filler is preferably used because of its wide solvent-selectivity when a coating liquid for protective layer is prepared.

The content of the filler is preferably 10% by mass or more and 60% by mass or less, more preferably 10% by mass or more and 50% by mass or less, even more preferably 20% by mass or more and 40% by mass or less, based on the total mass of the protective layer 5.

There is not particular limitation on the thickness of the protective layer 5, and the thickness is preferably 1 μm or more and 15 μm or less, more preferably 2 μm or more and 6 μm or less. Setting the thickness of the protective layer 5 within this range enables the foil cutting property to be further improved and physical durability and chemical durability imparted to a print obtained by transferring the transfer layer 10 onto a transfer receiving article to be better.

There is no limitation on a method for forming the protective layer 5. The protective layer 5 may be formed by dissolving or dispersing a resin component and various additive to be used as required in an appropriate solvent to prepare a coating liquid for protective layer, applying the coating liquid on one surface of the substrate 1 or an optional layer provided on the one surface of the substrate 1 (e.g., a release layer mentioned below), and drying the coated liquid. A protective layer 5 including a cured product of an active ray-curable resin may be formed by preparing a coating liquid for protective layer including an active ray-curable resin, applying the coating liquid on the other surface of the substrate 1 or an optional layer provided on the other surface of the substrate 1 to form a coated film of a protective layer, and Irradiating this coated film with an active ray to crosslink and cure the polymerization components such as the above polymerizable copolymer. When ultraviolet irradiation is applied as active ray irradiation, conventionally known ultraviolet irradiation apparatuses can be used. For example, various apparatuses such as high pressure mercury lamps, low pressure mercury lamps, carbon arcs, xenon arcs, metal halide lamps, non-electrode ultraviolet lamps, and LEDs can be used without limitation. Alternatively, when an electron beam is applied as active ray irradiation, a high energy-type electron beam irradiation apparatus that applies an electronic beam at an energy of 100 keV or more and 300 keV or less, a low energy-type electron beam irradiation apparatus that applies an electronic beam at an energy of 100 keV or less, or the like can be used. In terms of the irradiation mode, either of a scanning-type irradiation apparatus or a curtain-type irradiation apparatus may be used.

There is no particular limitation on the thickness of the protective layer 5, and the thickness is generally 0.5 μm or more and 10 μm or less.

(Adhesive Layer)

As shown in FIG. 2, the transfer layer 10 may have a layered structure of a protective layer 5 and an adhesive layer 6 which are layered in this order from the side of the substrate 1. According to the transfer layer 10 of this aspect, it is possible to impart better adhesion to the transfer layer 10 without causing the protective layer 5 to contain a component for imparting adhesion to a transfer receiving article (component having adhesion).

There is no particular limitation on the resin component having an adhesive layer, and examples thereof can include resin components, such as polyurethanes, polyolefins such as α-olefin-maleic anhydride, polyesters, acrylic resins, epoxy resins, urea resins, melamine resins, phenol resins, polyvinyl acetate, vinyl chloride-vinyl acetate copolymers, and cyano acrylate.

The thickness of the adhesive layer 6 is preferably 0.5 μm or more and 10 μm or less. There is no limitation on a method for forming the adhesive layer, and the adhesive layer may be formed by dispersing or dissolving the adhesive exemplified above and additives to be added as required in an appropriate solvent to prepare a coating liquid for adhesive layer, applying this coating liquid onto the protective layer 5 or an optional layer provided on the protective layer 5, and drying the applied liquid.

(Peelable Layer)

When the transfer layer 10 is a transfer layer 10 having a layered structure including the protective layer 5, a peelable layer may be located nearest from the substrate 1 (not shown), among layers constituting the transfer layer 10.

Examples of the resin component of the peelable layer can include ethylene-vinyl acetate copolymers, vinyl chloride-vinyl acetate copolymers, maleic acid-modified vinyl chloride-vinyl acetate copolymers, polyamides, polyesters, polyethylene, ethylene-isobutyl acrylate copolymers, butyral, polyvinyl acetate and copolymers thereof, ionomer resins, acid-modified polyolefins, (meth)acrylic resins such as acrylic type and methacrylic type, acrylic acid ester resins, ethylene-(meth)acrylic acid copolymers, ethylene-(meth) acrylic acid ester copolymers, polymethyl methacrylate, cellulose resins, polyvinyl ethers, urethane resins, polycarbonate, polypropylene, epoxy resins, phenol resins, vinyl resins, maleic acid resins, alkyd resins, polyethylene oxides, urea resins, melamine resins, melamine-alkyd resins, silicone resins, rubber-type resins, styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS).

There is not particular limitation on the thickness of the peelable layer, and the thickness is preferably 1 μm or more and 15 μm or less.

(Release Layer)

A release layer (not shown) may be provided between the substrate 1 and the transfer layer 10. Examples of the components of the release layer can include waxes, silicone wax, silicone resins, silicone-modified resins, fluorine resins, fluorine-modified resins, polyvinyl alcohol, acrylic resin, thermally crosslinkable epoxy-amino resins, and thermally crosslinkable alkyd-amino resins.

The thickness of the release layer is generally 0.5 μm or more and 5 μm or less. There is no limitation on a method for forming the release layer, and, for example, the release layer may be formed by dispersing or dissolving the above components in an appropriate solvent to prepare a coating liquid for release layer, applying this coating liquid onto the substrate 1, and drying the applied liquid.

When the release layer is provided on the substrate 1, the surface of the substrate 1 on the side of the release layer may be subjected to adhesive treatment in order to improve the adhesion between the substrate 1 and the release layer. As the adhesive treatment, a known resin surface modification technique, for example, corona discharge treatment, flame treatment, ozone treatment, ultraviolet treatment, radiation treatment, roughening treatment, chemical treatment, plasma treatment, low-temperature treatment, primer treatment, and grafting treatment, can be applied as it is. Two or more of these treatments also can be used in combination.

(Colorant Layer)

As shown in FIG. 3, a colorant layer 7 may be provided on the other surface of the substrate 1 so as to be frame sequential to the transfer layer 10 described above. In the thermal transfer sheet 100 of the aspect shown in FIG. 3, a single colorant layer 7 is provided on the other surface of the substrate 1 (a portion of the upper face of the substrate 1 in the aspect shown). On the other surface of the substrate, a plurality of colorant layers, for example, a yellow colorant layer, a magenta colorant layer, a cyan colorant layer, a black colorant layer, and the like may be provided in a frame-sequential manner. When the colorant layer 7 and the transfer layer 10 are used to form "one unit", the "one unit" can be repeatedly provided on the other surface of the substrate 1.

According to the thermal transfer sheet of the aspect shown in FIG. 3, it is possible to form a thermal transferred image on a transfer receiving article and transfer the transfer layer 10 onto the formed thermal transferred image using one thermal transfer sheet 100. Additionally, when a thermal transferred image is formed, it is possible to prevent print omission from occurring on the thermal transferred image by means of the back face layer 20 described above. In other words, according to the thermal transfer sheet of the aspect shown in FIG. 3, it is possible to prevent print omission from occurring on both the thermal transferred image to be formed and the transfer layer to be transferred and make the gloss of the transfer layer to be transferred well.

The thermal transfer sheet 100 of the present disclosure having the colorant layer 7 may be a thermal transfer sheet 100 to be used for forming a thermal transferred image by a sublimation-type thermal transfer method or may be a thermal transfer sheet 100 to be used for forming a thermal transferred image by a melt-type thermal transfer method.

(Colorant Layer to be Used for Sublimation-Type Thermal Transfer Method)

There is no limitation on a binder resin contained in the colorant layer 7 to be used for the sublimation-type thermal transfer method, and examples thereof can include resin components including cellulosic resins, such as ethyl cellulose, hydroxyethyl cellulose, ethyl hydroxy cellulose, methyl cellulose, and cellulose acetate, vinyl resins such as polyvinyl alcohol, polyvinyl acetate, polyvinyl butyral, polyvinyl acetoacetal, and polyvinyl pyrrolidone, acrylic resins such as poly(meth)acrylate and poly(meth)acrylamide, urethane resins, polyamides, and polyesters.

There is no particular limitation on the content of the binder resin, and the content of the binder resin is preferably 20% by mass or more based on the total mass of the colorant layer 7. Setting the content of the binder resin to 20% by mass or more based on the total mass of the colorant layer 7 enables a sublimable dye to be sufficiently maintained in the colorant layer 7 to thereby result in an improvement in storage stability. There is no particular limitation on the upper limit of the content of the binder resin, and the upper limit is only required to be determined in accordance with the content of the sublimable dye and optional additives.

The colorant layer 7 to be used for the sublimation-type thermal transfer method contains a sublimable dye as the colorant component. There is no particular limitation on the sublimable dye, and sublimable dyes having a sufficient color density and not discoloring and fading due to light, heat, temperature, and the like are preferred. Examples of the dye can include diarylmethane-type dyes, triarylmethane-type dyes, thiazole-type dyes, merocyanine dyes, pyrazolone dyes, methine-type dyes, indoaniline-type dyes, azomethine-type dyes such as acetophenoneazomethine, pyrazoloazomethine, imidazoleazomethine, imidazoazomethine, and pyridoneazomethine, xanthene-type dyes, oxazine-type dyes, dicyanostyrene-type dyes such as dicyanostyrene and tricyanostyrene, thiazine-type dyes, azine-type dyes, acridine-type dyes, benzeneazo-type dyes, azo-type dyes such as pyridoneazo, thiopheneazo, isothiazoleazo, pyrroleazo, pyrrazoleazo, imidazoleazo, thiadiazoleazo, triazoleazo, and disazo, spiropyran-type dyes, indolinospiropyran-type dyes, fluoran-type dyes, rhodaminelactam-type dyes, naphthoquinone-type dyes, anthraquinone-type dyes, and quinophthalone-type dyes. Specific examples thereof can include red dyes such as MS Red G (Mitsui Toatsu Kagaku Kabushiki Kaisha), Macrolex Red Violet R (Bayer AG), Ceres Red 7B (Bayer AG), and Samaron Red F3BS (Mitsubishi Chemical Corporation), yellow dyes such as Foron Brilliant Yellow 6GL (Clariant GmbH), PTY-52 (Mitsubishi Chemical Corporation), and Macrolex yellow 6G (Bayer AG), and blue dyes such as Kayaset(R) Blue 714 (NIPPON KAYAKU Co., Ltd.), Foron Brilliant Blue S-R (Clariant GmbH), MS Blue 100 (Mitsui Toatsu Kagaku Kabushiki Kaisha), and C.I. Solvent 63.

The content of the sublimable dye is preferably 50% by mass or more and 350% by mass or less, more preferably 80% by mass or more and 300% by mass or less, based on the total mass of the binder resin. Setting the content of the sublimable dye to the preferred content described above enables the print density and storage stability to be further improved.

(Colorant Primer Layer)

When a colorant layer 7 to be used for the sublimation-type thermal transfer method is used as the colorant layer 7, a colorant primer layer (not shown), which is intended for improving the adhesion between the substrate 1 and the colorant layer 7, may be provided between the substrate 1 and the colorant layer 7.

There is no particular limitation on the colorant primer layer, and a colorant primer layer conventionally known in the field of thermal transfer sheets can be appropriately selected and used. An exemplary colorant primer layer is constituted by a resin component. Examples of the resin component constituting the colorant primer layer can include resin components such as polyesters, polyvinyl pyrrolidone, polyvinyl alcohol, polyacrylic esters, polyvinyl acetate, urethane resins, styrene acrylate, polyacrylamide, polyamides, polyvinyl acetoacetal, and polyvinyl butyral. The colorant primer layer may also contain various additives such as organic particles and inorganic particles along with the resin component.

There is no particular limitation on a method of forming the colorant primer layer, and the colorant primer layer may be formed by dispersing or dissolving the resin component exemplified above and additives to be added as required in an appropriate solvent to prepare a coating liquid for colorant primer layer, applying this coating liquid onto the substrate 1, and drying the applied liquid. There is no particular limitation on the thickness of the colorant primer layer, and the thickness is generally 0.02 μm or more and 1 μm or less.

(Colorant Layer to be Used for Melt-Type Thermal Transfer Method)

The colorant layer to be used for the melt-type thermal transfer method contains a coloring agent and a binder. Examples of a wax component that can be used as the binder can include various waxes such as microcrystalline wax, carnauba wax, paraffin wax, Fischer-Tropsch wax, various low molecular weight polyethylenes, Japan wax, beeswax, spermaceti, Chinese wax, wool wax, shellac wax, candelilla wax, petrolatum, polyester wax, partially-modified wax, fatty acid esters, and fatty acid amides.

Examples of a resin component that can be used as the binder can include ethylene-vinyl acetate copolymers, ethylene-acrylic acid ester copolymers, polyethylene, polystyrene, polypropylene, polybutene, petroleum resins, vinyl chloride resins, vinyl chloride-vinyl acetate copolymers, polyvinyl alcohol, vinylidene chloride resins, acrylic resins, methacrylic resins, polyamides, polycarbonate, fluorine resins, polyvinyl formal, polyvinyl butyral, acetyl cellulose, nitrocellulose, polyvinyl acetate, polyisobutylene, ethyl cellulose, and polyvinyl acetoacetal.

The coloring agent may be appropriately selected from known organic or inorganic pigments or dyes, and for example, coloring agents having a sufficient color density and not discoloring and fading due to light, heat, and the like are preferred. The coloring agent may be a material that develops color by heating or a material that develops color when brought into contact with a component applied on the surface of a transfer receiving article. Further, the color of the coloring agent is not limited to cyan, magenta, yellow, and black, and coloring agents of various colors can be used.

(Transfer Receiving Article)

Examples of the transfer receiving article onto which the transfer layer 10 of the thermal transfer sheet 100 of the present disclosure is to be transferred include thermal transfer image-receiving sheets, plain paper, wood-free paper, tracing paper, plastic films, and plastic cards mainly composed of vinyl chloride, a vinyl chloride-vinyl acetate copolymer, or polycarbonate. As the transfer receiving article, one having a predetermined image also can be used. The transfer receiving article may be colored or may have transparency.

(Method for Transferring Transfer Layer)

There is no particular limitation on a method for transferring the transfer layer onto a transfer receiving article, and the method can be performed using, for example, a thermal transfer printer having a heating device such as a thermal head, or a heating device such as a hot stamp or a heat roll. The thermal transfer sheet 100 of the present disclosure, which enables prevention of occurrence of print omission on the transfer layer to be transferred, can be suitably used in combination with a thermal transfer printer having a heating device such as a thermal head, which printer is likely to cause print omission in comparison with a hot stamp, a heat roll, or the like.

Although the resin components and the like constituting each layer are herein described exemplarily, each of these resins may be a homopolymer of a monomer constituting each resin, or a copolymer of the main component monomer constituting each resin and one or more other polymers, or a derivative thereof. For example, a reference to an acrylic resin is only required to include a monomer of acrylic acid or methacrylic acid, or an acrylic acid ester or methacrylic acid ester as the main component. The acrylic resin also may be a modified product of these resins. A resin component other than those described herein also may be used.

EXAMPLES

Next, the present invention will be described more concretely with reference to examples and comparative examples. Hereinbelow, unless otherwise particularly specified, the expression of part(s) or % means that by mass, representing a formulation not in terms of solid content.

Example 1

As a substrate, a polyethylene terephthalate film having a thickness of 4.5 μm was used. On one surface of this substrate, a coating liquid for back face primer layer having the following composition was applied, and the applied liquid was dried to form a back face primer layer having a thickness of 0.1 μm. A coating liquid for back face layer having the following composition was applied on this back face primer layer, and the applied liquid was dried to form a back face layer having a thickness of 0.4 μm. On the other surface of the substrate, a coating liquid for colorant primer layer having the following composition was applied, and the applied liquid was dried to from a colorant primer layer having a thickness of 0.25 μm. A coating liquid for yellow colorant layer, a coating liquid for magenta colorant layer, and a coating liquid for cyan colorant layer having the following composition were applied on this colorant primer layer, and the applied liquids were dried to form a colorant layer, in which a yellow colorant layer, a magenta colorant layer, and a cyan colorant layer each having a thickness of 0.5 μm were provided in this order in a frame-sequential manner. Additionally, on a portion of the other surface of the substrate, a coating liquid for peelable layer having the following composition was applied, and the applied liquid was dried to form a peelable layer having a thickness of 1 μm. Then, a coating liquid for protective layer having the following composition was applied on the peelable layer, the applied liquid was dried to from a protective layer having a thickness of 2 μm, and thus, a thermal transfer sheet of Example 1 was prepared. The peelable layer and the protective layer constitute the transfer layer of the thermal transfer sheet of the present disclosure.

| <Coating liquid for colorant primer layer> | |
|---|---|
| Alumina sol | 4 parts |
| (Alumina sol 200, Nissan Chemical Industries, Ltd.) | |
| Cationic urethane resin | 6 parts |
| (SF-600, Dai-ichi Kogyo Seiyaku, Co., Ltd.) | |
| Water | 100 parts |
| Isopropyl alcohol | 100 parts |
| <Coating liquid for yellow colorant layer 1> | |
| Disperse dye (Foron Brilliant Yellow S-6GL) | 5.5 parts |
| Polyvinyl acetoacetal | 4.5 parts |
| (S-LEC(R) KS-5, SEKISUI CHEMICAL CO., LTD.) | |
| Phosphoric ester type surfactant | 0.1 part |
| (PLYSURF(R) A208N, Dai-ichi Kogyo Seiyaku, Co., Ltd.) | |
| Epoxy-modified silicone oil | 0.04 parts |
| (KF-101, manufactured by Shin-Etsu Chemical Co., Ltd.) | |
| Polyethylene wax | 0.1 part |
| Methyl ethyl ketone | 45 parts |
| Toluene | 45 parts |
| <Coating liquid for magenta colorant layer 1> | |
| Disperse dye (MS Red G) | 1.5 parts |
| Disperse dye (Macrolex Red Violet R) | 2 parts |
| Polyvinyl acetoacetal | 4.5 parts |
| (S-LEC(R) KS-5, SEKISUI CHEMICAL CO., LTD.) | |
| Phosphoric ester type surfactant | 0.1 part |
| (PLYSURF(R) A208N, Dai-ichi Kogyo Seiyaku, Co., Ltd.) | |
| Polyethylene wax | 0.1 part |
| Epoxy-modified silicone oil | 0.04 parts |
| (KF-101, manufactured by Shin-Etsu Chemical Co., Ltd.) | |
| Methyl ethyl ketone | 45 parts |
| Toluene | 45 parts |
| <Coating liquid for cyan colorant layer 1> | |

-continued

| | |
|---|---|
| Disperse dye (Solvent Blue 63) | 3.5 parts |
| Disperse dye (HSB-2194) | 3 parts |
| Polyvinyl acetoacetal | 4.5 parts |
| (S-LEC(R) KS-5, SEKISUI CHEMICAL CO., LTD.) | |
| Phosphoric ester type surfactant | 0.1 part |
| (PLYSURF(R) A208N, Dai-ichi Kogyo Seiyaku, Co., Ltd.) | |
| Polyethylene wax | 0.1 part |
| Epoxy-modified silicone oil | 0.04 parts |
| (KF-101, manufactured by Shin-Etsu Chemical Co., Ltd.) | |
| Methyl ethyl ketone | 45 parts |
| Toluene | 45 parts |
| <Coating liquid for peelable layer> | |
| Acrylic resin | 29 parts |
| (DIANAL(R) BR-87, Mitsubishi Chemical Corporation) | |
| Polyester | 1 part |
| (Vylon(R) 200, TOYOBO CO., LTD.) | |
| Methyl ethyl ketone | 35 parts |
| Toluene | 35 parts |
| <Coating liquid for protective layer> | |
| Polyester | 30 parts |
| (Vylon(R) 200, TOYOBO CO., LTD.) | |
| Methyl ethyl ketone | 35 parts |
| Toluene | 35 parts |
| <Coating liquid for back face primer layer> | |
| Polyester (solid content: 30%) | 16.67 parts |
| (POLYESTER(R) WR-961, The Nippon Synthetic Chemical Industry Co., Ltd.) | |
| Water | 41.67 parts |
| Isopropyl alcohol | 41.67 parts |
| <Coating liquid for back face layer 1> | |
| Polyvinyl butyral | 24 parts |
| (S-LEC(R) BX-1, SEKISUI CHEMICAL CO., LTD.) | |
| Curing agent (polyisocyanate) (solid content: 75%) | 213 parts |
| (BURNOCK(R) D750, DIC Corporation) | |
| Spherical silicone resin (average particle size: 0.7 μm) | 10 parts |
| (X-52-854, manufactured by Shin-Etsu Chemical Co., Ltd.) | |
| Silicone oil (solid content: 30%) | 20 parts |
| (MODIPER(R) FS730, NOF CORPORATION) | |
| Toluene | 366 parts |
| Methyl ethyl ketone | 366 parts |

Example 2

A thermal transfer sheet of Example 2 was obtained exactly in the same manner as in Example 1 except that the coating liquid for back face layer 1 was replaced by a coating liquid for back face layer 2 having the following composition to form the back face layer.

| <Coating liquid for back face layer 2> | |
|---|---|
| Polyvinyl butyral | 26 parts |
| (S-LEC(R) BX-1, SEKISUI CHEMICAL CO., LTD.) | |
| Curing agent (polyisocyanate) (solid content: 75%) | 221 parts |
| (BURNOCK(R) D750, DIC Corporation) | |
| Spherical silicone resin (average particle size: 0.7 μm) | 2 parts |
| (X-52-854, manufactured by Shin-Etsu Chemical Co., Ltd.) | |
| Silicone oil (solid content: 30%) | 20 parts |
| (MODIPER(R) FS730, NOF CORPORATION) | |
| Toluene | 366 parts |
| Methyl ethyl ketone | 366 parts |

Example 3

A thermal transfer sheet of Example 3 was obtained exactly in the same manner as in Example 1 except that the coating liquid for back face layer 1 was replaced by a coating liquid for back face layer 3 having the following composition to form the back face layer.

| <Coating liquid for back face layer 3> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 200 parts |
| Spherical silicone resin (average particle size: 0.7 μm) (X-52-854, manufactured by Shin-Etsu Chemical Co., Ltd.) | 20 parts |
| Silicone oil (solid content: 30%) (MODIPER(R) FS730, NOF CORPORATION) | 20 parts |
| Toluene | 368 parts |
| Methyl ethyl ketone | 368 parts |

Example 4

A thermal transfer sheet of Example 4 was obtained exactly in the same manner as in Example 1 except that the coating liquid for back face layer 1 was replaced by a coating liquid for back face layer 4 having the following composition to form the back face layer.

| <Coating liquid for back face layer 4> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical melamine - formaldehyde condensate (average particle size: 0.4 μm) (EPOSTAR(R) S6, The Nippon Synthetic Chemical Industry Co., Ltd.) | 10 parts |
| Silicone oil (solid content: 30%) (MODIPER(R) FS730, NOF CORPORATION) | 20 parts |
| Toluene | 366 parts |
| Methyl ethyl ketone | 366 parts |

Example 5

A thermal transfer sheet of Example 5 was obtained exactly in the same manner as in Example 1 except that the coating liquid for back face layer 1 was replaced by a coating liquid for back face layer 5 having the following composition to form the back face layer.

| <Coating liquid for back face layer 5> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical silicone resin (average particle size: 3.5 μm) (KMP-701, manufactured by Shin-Etsu Chemical Co., Ltd.) | 10 parts |
| Silicone oil (solid content: 30%) (MODIPER(R) FS730, NOF CORPORATION) | 20 parts |
| Toluene | 366 parts |
| Methyl ethyl ketone | 366 parts |

Example 6

A thermal transfer sheet of Example 6 was obtained exactly in the same manner as in Example 1 except that the coating liquid for back face layer 1 was replaced by a coating liquid for back face layer 6 having the following composition to form the back face layer.

| <Coating liquid for back face layer 6> | |
|---|---|
| Polyvinyl butyral (S-LEC(R) BX-1, SEKISUI CHEMICAL CO., LTD.) | 22 parts |
| Curing agent (polyisocyanate) (solid content: 75%) (BURNOCK(R) D750, DIC Corporation) | 189 parts |
| Spherical silicone resin (average particle size: 0.7 μm) (X-52-854, manufactured by Shin-Etsu Chemical Co., Ltd.) | 30 parts |
| Silicone oil (solid content: 30%) (MODIPER(R) FS730, NOF CORPORATION) | 20 parts |
| Toluene | 370 parts |
| Methyl ethyl ketone | 370 parts |

Example 7

A thermal transfer sheet of Example 7 was obtained exactly in the same manner as in Example 1 except that the coating liquid for back face layer 1 was replaced by a coating liquid for back face layer 7 having the following composition to form the back face layer.

| <Coating liquid for back face layer 7> | |
|---|---|
| Polyvinyl butyral (S-LEC(R) BX-1, SEKISUI CHEMICAL CO., LTD.) | 26 parts |
| Curing agent (polyisocyanate) (solid content: 75%) (BURNOCK(R) D750, DIC Corporation) | 219 parts |
| Spherical silicone resin (average particle size: 0.7 μm) (X-52-854, manufactured by Shin-Etsu Chemical Co., Ltd.) | 4 parts |
| Silicone oil (solid content: 30%) (MODIPER(R) FS730, NOF CORPORATION) | 20 parts |
| Toluene | 366 parts |
| Methyl ethyl ketone | 366 parts |

Example 8

A thermal transfer sheet of Example 8 was obtained exactly in the same manner as in Example 1 except that the coating liquid for hack face layer 1 was replaced by a coating liquid for back face layer 8 having the following composition to form the back face layer.

| <Coating liquid for back face layer 8> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical silicone resin (average particle size: 0.7 μm) (X-52-854, manufactured by Shin-Etsu Chemical Co., Ltd.) | 9.5 parts |
| Spherical silicone resin (average particle size: 3.5 μm) (KMP-701, manufactured by Shin-Etsu Chemical Co., Ltd.) | 0.5 parts |
| Silicone oil (solid content: 30%) (MODIPER(R) FS730, NOF CORPORATION) | 20 parts |
| Toluene | 366 parts |
| Methyl ethyl ketone | 366 parts |

Example 9

A thermal transfer sheet of Example 9 was obtained exactly in the same manner as in Example 1 except that the coating liquid for back face layer 1 was replaced by a coating liquid for back face layer 9 having the following composition to form the back face layer.

| <Coating liquid for back face layer 9> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical silicone resin (average particle size: 0.7 μm) (X-52-854, manufactured by Shin-Etsu Chemical Co., Ltd.) | 9 parts |
| Polygonal shape talc (average particle size: 1 μm) (SG-2000, Nippon Talc Co., Ltd.) | 1 part |
| Silicone oil (solid content: 30%) (MODIPER(R) FS730, NOF CORPORATION) | 20 parts |
| Toluene | 366 parts |
| Methyl ethyl ketone | 366 parts |

Example 10

A thermal transfer sheet of Example 10 was obtained exactly in the same manner as in Example 1 except that the coating liquid for back face layer 1 was replaced by a coating liquid for back face layer 10 having the following composition to form the back face layer.

| <Coating liquid for back face layer 10> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical silicone resin (average particle size: 0.7 μm) (X-52-854, manufactured by Shin-Etsu Chemical Co., Ltd.) | 8.5 parts |
| Spherical silicone resin (average particle size: 3.5 μm) (KMP-701, manufactured by Shin-Etsu Chemical Co., Ltd.) | 1.5 parts |
| Silicone oil (solid content: 30%) (MODIPER(R) FS730, NOF CORPORATION) | 20 parts |
| Toluene | 366 parts |
| Methyl ethyl ketone | 366 parts |

Example 11

A thermal transfer sheet of Example 11 was obtained exactly in the same manner as in Example 1 except that the coating liquid for back face layer 1 was replaced by a coating liquid for back face layer 11 having the following composition to form the back face layer.

| <Coating liquid for back face layer 11> | |
|---|---|
| Polyvinyl butyral (S-LEC(R) BX-1, SEKISUI CHEMICAL CO., LTD.) | 24 parts |
| Curing agent (polyisocyanate) (solid content: 75%) (BURNOCK(R) D750, DIC Corporation) | 213 parts |
| Spherical silicone resin (average particle size: 0.7 μm) (X-52-854, manufactured by Shin-Etsu Chemical Co., Ltd.) | 8 parts |
| Polygonal shape talc (average particle size: 1 μm) (SG-2000, Nippon Talc Co., Ltd.) | 2 parts |
| Silicone oil (solid content: 30%) (MODIPER(R) FS730, NOF CORPORATION) | 20 parts |
| Toluene | 366 parts |
| Methyl ethyl ketone | 366 parts |

Example 12

A thermal transfer sheet of Example 12 was obtained exactly in the same manner as in Example 1 except that the coating liquid for back face layer 1 was replaced by a coating liquid for back face layer 12 having the following composition to form the back face layer.

<Coating Liquid for Back Face Layer 12>

Alkoxysilyl group-containing resin (solid content: 50%) (ACRIT(R) 8SQ-1020, Taisei Fine Chemical Co., Ltd.)

Curing agent (dioctyltin-type catalyst) 10 parts (Neostan (R) U-830, Nitto Kasei Co., Ltd.)

Spherical silicone resin (average particle size: 0.7 μm) 10 parts (X-52-854, manufactured by Shin-Etsu Chemical Co., Ltd.)

Silicone oil (solid content: 30%) 20 parts (MODIPER(R) FS730, NOF CORPORATION)

Methyl ethyl ketone 612 parts

Example 13

A thermal transfer sheet of Example 13 was obtained exactly in the same manner as in Example 1 except that the coating liquid for back face layer 1 was replaced by a coating liquid for back face layer 13 having the following composition to form the back face layer.

| <Coating liquid for back face layer 13> | |
|---|---|
| Acrylic polyol (solid content: 36.5%) (6KW-700, Taisei Fine Chemical Co., Ltd.) | 367 parts |
| Curing agent (polyisocyanate) (solid content: 75%) (BURNOCK(R) D750, DIC Corporation) | 67 parts |
| Spherical silicone resin (average particle size: 0.7 μm) (X-52-854, manufactured by Shin-Etsu Chemical Co., Ltd.) | 10 parts |
| Silicone oil (solid content: 30%) (MODIPER(R) FS730, NOF CORPORATION) | 20 parts |
| Methyl ethyl ketone | 268 parts |
| Toluene | 268 parts |

Example 14

A thermal transfer sheet of Example 14 was obtained exactly in the same manner as in Example 1 except that the coating liquid for back face layer 1 was replaced by a coating liquid for back face layer 14 having the following composition to form the back face layer.

| <Coating liquid for back face layer 14> | |
|---|---|
| Acrylic resin (DIANAL(R) BR-80, Mitsubishi Chemical Corporation) | 184 parts |
| Spherical silicone resin (average particle size: 0.7 μm) (X-52-854, manufactured by Shin-Etsu Chemical Co., Ltd.) | 10 parts |
| Silicone oil (solid content: 30%) (MODIPER(R) FS730, NOF CORPORATION) | 20 parts |
| Toluene | 393 parts |
| Methyl ethyl ketone | 393 parts |

Comparative Example 1

A thermal transfer sheet of Comparative Example 1 was obtained exactly in the same manner as in Example 1 except that the coating liquid for back face layer 1 was replaced by a coating liquid for back face layer A having the following composition to form the back face layer.

| <Coating solution for back face layer A> | |
|---|---|
| Polyvinyl butyral (S-LEC(R) BX-1, SEKISUI CHEMICAL CO., LTD.) | 24 parts |
| Polyisocyanate (BURNOCK(R) D750, DIC Corporation) | 213 parts |

-continued

| <Coating solution for back face layer A> | |
|---|---|
| Polygonal shape talc (average particle size: 1 μm) | 10 part |
| (SG-2000, Nippon Talc Co., Ltd.) | |
| Silicone oil (solid content: 30%) | 20 parts |
| (MODIPER(R) FS730, NOF CORPORATION) | |
| Toluene | 366 parts |
| Methyl ethyl ketone | 366 parts |

Comparative Example 2

A thermal transfer sheet of Comparative Example 2 was obtained exactly in the same manner as in Example 1 except that the coating liquid for back face layer 1 was replaced by a coating liquid for back face layer B having the following composition to form the back face layer.

| <Coating solution for back face layer B> | |
|---|---|
| Polyvinyl butyral | 24 parts |
| (S-LEC(R) BX-1, SEKISUI CHEMICAL CO., LTD.) | |
| Polyisocyanate | 213 parts |
| (BURNOCK(R) D750, DIC Corporation) | |
| Polygonal shape silicone resin (average particle size: 4 μm) | 10 parts |
| (Tospearl 240, Momentive Performance Materials Japan LLC) | |
| Silicone oil (solid content: 30%) | 20 parts |
| (MODIPER(R) FS730, NOF CORPORATION) | |
| Toluene | 366 parts |
| Methyl ethyl ketone | 366 parts |

Comparative Example 3

A thermal transfer sheet of Comparative Example 3 was obtained exactly in the same manner as in Example 1 except that the coating liquid for back face layer 1 was replaced by a coating liquid for back face layer C having the following composition to form the back face layer.

| <Coating solution for back face layer C> | |
|---|---|
| Polyvinyl butyral | 27 parts |
| (S-LEC(R) BX-1, SEKISUI CHEMICAL CO., LTD.) | |
| Polyisocyanate | 221 parts |
| (BURNOCK(R) D750, DIC Corporation) | |
| Spherical silicone resin (average particle size: 0.7 μm) | 1 part |
| (X-52-854, manufactured by Shin-Etsu Chemical Co., Ltd.) | |
| Silicone oil (solid content: 30%) | 20 parts |
| (MODIPER(R) FS730, NOF CORPORATION) | |
| Toluene | 366 parts |
| Methyl ethyl ketone | 366 parts |

Comparative Example 4

A thermal transfer sheet of Comparative Example 4 was obtained exactly in the same manner as in Example 1 except that the coating liquid for back face layer 1 was replaced by a coating liquid for back face layer D having the following composition to form the back face layer.

| <Coating liquid for back face layer D> | |
|---|---|
| Polyvinyl butyral | 22 parts |
| (S-LEC(R) BX-1, SEKISUI CHEMICAL CO., LTD.) | |
| Polyisocyanate | 176 parts |
| (BURNOCK(R) D750, DIC Corporation) | |
| Spherical silicone resin (average particle size: 0.7 μm) | 40 parts |
| (X-52-854, manufactured by Shin-Etsu Chemical Co., Ltd.) | |
| Silicone oil (solid content: 30%) | 20 parts |
| (MODIPER(R) FS730, NOF CORPORATION) | |
| Toluene | 371 parts |
| Methyl ethyl ketone | 371 parts |

(Calculation of Ratio of Area Occupied by Spherical Particles)

The surface of the back face layer around the center with respect to the slit width of the thermal transfer sheet in the portion of the back face layer overlapping the transfer layer was observed with a scanning electron microscope (SU1510, Hitachi High-Technologies Corporation) at a magnification of 5000 times. The projected area of each spherical particles was calculated using image analysis software (Image J, U.S. National Institute of Health), and the projected areas of spherical particles were summed up into the summed area of spherical particles. The summed area of the spherical particles was divided by the area of the entire observed surface to calculate the ratio of area occupied by the spherical particles (%). The calculation results are shown in Table 1 (the column of "Ratio of area occupied (spherical particles)" in Table 1).

(Calculation of Ratio of Area Occupied by Non-Spherical Particles)

The projected areas of all the particles including spherical particles and non-spherical particles of the thermal transfer sheets of Examples 9 and 11 were each calculated in the same manner as for the calculation of ratio of area occupied by spherical particles described above. All the projected areas were summed up into the summed area of all the particles, and the projected areas of the spherical particles were summed up into the summed area of the spherical particles. The summed area of spherical particles was subtracted from the summed area of all the particles to obtain the summed area of the non-spherical particles (the area obtained by summing up of the projected areas of the non-spherical particles). The summed area of the non-spherical particles was divided by the area of the entire observed surface to calculate the ratio of area occupied by the non-spherical particles (%). The calculation results are shown in Table 1 (the column of "Ratio of area occupied (non-spherical particles)" in Table 1). The ratio of area occupied by non-spherical particles of any of the thermal transfer sheets of Examples 1 to 8, 10, 12 to 14 and Comparative Examples 3 and 4, in which the back face layer contains no non-spherical particles, is 0%. The ratio of area occupied by non-spherical particles of the thermal transfer sheets of each of Comparative Examples 1 and 2 has not been calculated.

(Calculation of Proportion Occupied by Spherical Particles Having Maximum Diameter of 0.1 μm or More and 3 μm or Less)

The surface of the back face layer around the center with respect to the slit width of the thermal transfer sheet was observed with a scanning electron microscope (SU1510, Hitachi High-Technologies Corporation) at a magnification of 5000 times. Image analysis software (Image J, U.S. National Institute of Health) was used to count the total number of the spherical particles projected on the observed surface (A) and the summed number of spherical particles having a maximum diameter of 0.1 μm or more and 3 μm or less (B) determined from the projection image of the observed surface. This summed number (B) was divided by the total number of the spherical particles within the observed surface (A) to calculate the proportion occupied by the spherical particles having a maximum diameter of 0.1 μm or more and 3 μm or less. The calculation results are shown in Table 1 (the column "Proportion" in Table 1).

(Production of Print)

By use of a sublimable-type thermal transfer printer (DS40, Dai Nippon Printing Co., Ltd.) and the thermal transfer sheet of each of Examples and Comparative Examples prepared above, a black solid image was printed on a genuine image receiving sheet of the sublimable-type thermal transfer printer as a transfer receiving article under the default conditions of the printer to obtain an image-formed product. Then, by use of the above sublimable-type thermal transfer printer, the transfer layer of the thermal transfer sheet of each of Examples and Comparative Examples was transferred onto the image-formed product obtained above under the default conditions of the printer to obtain a print of each of Examples and Comparative Examples, in which the image-formed product was formed on the transfer receiving article and the transfer layer was formed on this image-formed product.

(Gloss Evaluation)

The glossiness of the surface of the print of each of Examples and Comparative Examples obtained in the formation of the print described above was measured using a glossiness meter (Glossmeter VG7000 (Nippon Denshoku Industries Co. Ltd.) (measurement angle: 20°), and gloss evaluation was conducted under the following evaluation criteria. The evaluation results are shown in Table 1 (the column "Gloss" in Table 1).

"Evaluation Criteria"

A: The glossiness in the scanning direction is 59 or more, and the glossiness in the sub-scanning direction is 50 or more.

B: The glossiness in the scanning direction is 57 or more and less than 59, and the glossiness in the sub-scanning direction is 48 or more, or the glossiness in the scanning direction is 57 or more, and the glossiness in the sub-scanning direction is 48 or more and less than 50.

NG: The glossiness in the scanning direction is less than 57, or the glossiness in the sub-scanning direction is less than 48.

(Evaluation of Print Omission on Transfer Layer)

Ten prints were continuously produced in the same manner as in the above production of print, and print omission on the prints produced was evaluated under the following evaluation criteria. The evaluation results are shown in Table 1 (the column "print omission (transfer layer)" in Table 1).

"Evaluation Criteria"

A: No print omission on the transfer layer occurs in any of the prints.

B: Print omission on the transfer layer occurs in one of the prints.

NG: Print omission on the transfer layer occurs in two or more of the prints.

(Evaluation of Print Omission on Image-Formed Product)

Ten prints were continuously produced in the same manner as in the above production of print, and print omission in the prints produced was evaluated under the following evaluation criteria. The evaluation results are shown in Table 1 (the column "Print omission (image-formed product" in Table 1).

"Evaluation Criteria"

A: No print omission on the image-formed product occurs in any of the prints.

B: Print omission on image-formed product occurs in one of the prints.

NG: Print omission on image-formed product occurs in two or more of the prints.

TABLE 1

| | Ratio of area occupied (spherical particles) | Ratio of area occupied (non-spherical particles) | Proportion | Print omission (transfer layer) | Print omission (image-formed product) | Gloss |
|---|---|---|---|---|---|---|
| Example 1 | 5.7% | — | 95% | A | A | A |
| Example 2 | 2.0% | | 95% | B | A | A |
| Example 3 | 12.6% | | 95% | A | A | A |
| Example 4 | 4.1% | | 98% | B | B | A |
| Example 5 | 6.8% | | 90% | A | A | B |
| Example 6 | 17.4% | | 95% | A | A | B |
| Example 7 | 2.9% | | 95% | A | A | A |
| Example 8 | 6.3% | | 95% | A | A | A |
| Example 9 | 5.4% | 0.6% | 85% | B | A | B |
| Example 10 | 7.0% | — | 95% | A | A | B |
| Example 11 | 4.8% | 1.0% | 75% | B | B | B |
| Example 12 | 5.6% | — | 95% | A | A | A |
| Example 13 | 5.7% | | 95% | A | A | A |
| Example 14 | 5.7% | | 95% | B | B | B |
| Comparative Example 1 | 0% | Not calculated | 0% | NG | NG | NG |
| Comparative Example 2 | 0% | | 0% | B | B | NG |
| Comparative Example 3 | 1.6% | — | 95% | NG | NG | A |
| Comparative Example 4 | 21.8% | | 95% | A | A | NG |

REFERENCE SIGNS LIST

1 Substrate
5 Protective layer
6 Adhesive layer
7 Colorant layer
10 Transfer layer
20 Back face layer

25 Spherical particles
25A Particles
100 Thermal transfer sheet
200 Transfer receiving article
300 Print

The invention claimed is:

1. A thermal transfer sheet, comprising:

a back face layer provided on one surface of a substrate; and a transfer layer provided on an opposing surface of the substrate, wherein the transfer layer has a single-layer structure or a layered structure comprising a protective layer, wherein the back face layer contains spherical particles and a siloxane crosslinked resin, wherein when an observed surface of the back face layer is observed using a scanning electron microscope (SEM) at a magnification of 5000 times, a proportion of a total of projected areas of the spherical particles is in a range of 1.8% or more and 20% or less, based on an entire area of the observed surface, wherein the spherical particles are spherical silicone resin, and wherein the siloxane crosslinked resin is a crosslinked resin obtained by crosslinking an alkoxysilyl group-containing resin.

2. The thermal transfer sheet according to claim 1, wherein a proportion of a number of spherical particles having a maximum diameter in a range of 0.1 μm to 3 μm, which is determined from a projection image of the observed surface, is 80% or more based on a total number of the spherical particles observed in the observed surface.

3. The thermal transfer sheet according to claim 1, wherein a content of spherical particles having a maximum diameter in a range of 0.1 μm or more and 3 μm or less is 90% by mass or more based on the total mass of the spherical particles contained in the back face layer.

4. The thermal transfer sheet according to claim 2, wherein a content of spherical particles having a maximum diameter in the range of 0.1 μm or more and 3 μm or less is 90% by mass or more based on the total mass of the spherical particles contained in the back face layer.

* * * * *